United States Patent
Lei et al.

(10) Patent No.: US 11,050,184 B2
(45) Date of Patent: Jun. 29, 2021

(54) CONNECTOR INTERFACE AND MOBILE TERMINAL

(71) Applicant: HUAWEI TECHNOLOGIES CO., LTD., Guangdong (CN)

(72) Inventors: Gaobing Lei, Shanghai (CN); Wenqiong Fang, Shanghai (CN); Xiaolong Wang, Shenzhen (CN); Qiliang Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/463,523

(22) PCT Filed: Mar. 31, 2017

(86) PCT No.: PCT/CN2017/079125
§ 371 (c)(1),
(2) Date: May 23, 2019

(87) PCT Pub. No.: WO2018/094941
PCT Pub. Date: May 31, 2018

(65) Prior Publication Data
US 2019/0379152 A1    Dec. 12, 2019

(30) Foreign Application Priority Data
Nov. 25, 2016    (CN) .......................... 201611054889.7

(51) Int. Cl.
*H01R 13/52*    (2006.01)
*H01R 13/02*    (2006.01)

(52) U.S. Cl.
CPC .......... *H01R 13/521* (2013.01); *H01R 13/02* (2013.01); *H01R 13/5205* (2013.01)

(58) Field of Classification Search
CPC .. H01R 13/521; H01R 13/02; H01R 13/5205; H01R 13/6592; H01R 13/6594; H01R 13/6587
(Continued)

(56) References Cited

U.S. PATENT DOCUMENTS 7,771,236 B2 * 8/2010 Koyama ............ H01R 13/6275
                                               439/607.53
7,824,219 B2 * 11/2010 Wang ................. H01R 13/6582
                                               439/607.27
(Continued)

FOREIGN PATENT DOCUMENTS

CN    201252259 Y    6/2009
CN    202737218 U    2/2013
(Continued)

OTHER PUBLICATIONS

Office Action issued in Chinese Application No. 201780018298.0 dated Mar. 11, 2019, 19 pages (with English translation).
(Continued)

*Primary Examiner* — Abdullah A Riyami
*Assistant Examiner* — Hien D Vu
(74) *Attorney, Agent, or Firm* — Fish & Richardson P.C.

(57) ABSTRACT

Example connector interfaces such as a Type-C interface and a mobile terminal are disclosed. One example connector interface includes a substrate, a first metal shell, a second metal shell, and an insert mold (I/M) component that are disposed on the substrate. The second metal shell is in a sealed connection to the first metal shell. One end of the I/M component is located in the second metal shell, and the other end of the I/M component penetrates through the second metal shell and is inserted into the first metal shell. The end of the I/M component that is located in the second metal
(Continued)

shell is fixedly connected to the second metal shell, so that the I/M component is secured in an insertion direction.

20 Claims, 5 Drawing Sheets

(58) Field of Classification Search
USPC ............... 439/607.35–607.41, 0.53–0.56, 79
See application file for complete search history.

(56) References Cited

U.S. PATENT DOCUMENTS

| | | | | |
|---|---|---|---|---|
| 8,974,249 | B2* | 3/2015 | Zhang | H01R 12/724 |
| | | | | 439/607.4 |
| 9,401,568 | B1* | 7/2016 | Masuda | H01R 13/6581 |
| 2013/0315782 | A1 | 11/2013 | Huang | |
| 2014/0073190 | A1 | 3/2014 | Zhao et al. | |
| 2015/0270661 | A1 | 9/2015 | Kao et al. | |
| 2016/0006197 | A1* | 1/2016 | Sun | H01R 13/405 |
| | | | | 439/607.55 |
| 2016/0093974 | A1 | 3/2016 | Lai | |
| 2016/0164217 | A1 | 6/2016 | Lee | |
| 2016/0233594 | A1 | 8/2016 | Zhao et al. | |
| 2017/0288345 | A1 | 10/2017 | Kao et al. | |

FOREIGN PATENT DOCUMENTS

| | | |
|---|---|---|
| CN | 202856089 U | 4/2013 |
| CN | 103337735 A | 10/2013 |
| CN | 104538781 A | 4/2015 |
| CN | 204424570 U | 6/2015 |
| CN | 204424577 U | 6/2015 |
| CN | 104868272 A | 8/2015 |
| CN | 104916960 A | 9/2015 |
| CN | 204720605 U | 10/2015 |
| CN | 204760645 U | 11/2015 |
| CN | 105449443 A | 3/2016 |
| CN | 105514667 A | 4/2016 |
| CN | 205159630 U | 4/2016 |
| TW | M496259 U | 2/2015 |

OTHER PUBLICATIONS

PCT International Search Report and Written Opinion issued in International Application No. PCT/CN2017/079125 dated Jul. 28, 2017, 13 pages (with English translation).
Office action issued in Chinese Application No. 201780018298.0 dated Dec. 4, 2019, 8 pages.
Office Action issued in Chinese Application No. 201780018298.0 dated Jun. 15, 2020, 10 pages (with English translation).
Office Action issued in Chinese Application No. 201780018298.0 dated Dec. 4, 2020, 4 pages.

* cited by examiner

CONNECTOR INTERFACE AND MOBILE TERMINAL

CROSS-REFERENCE TO RELATED APPLICATIONS

This application is a National Stage of International Application No. PCT/CN2017/079125, filed on Mar. 31, 2017, which claims priority to Chinese Patent Application No. 201611054889.7, filed on Nov. 25, 2016. Both of the aforementioned applications are hereby incorporated by reference in their entireties.

TECHNICAL FIELD

This application relates to the field of mobile terminal technologies, and in particular, to a connector interface and a mobile terminal.

BACKGROUND

With development of mobile phones and various types of terminal devices, terminal vendors have increasingly high requirements on an overall waterproof standard and a transmission rate on an I/O interface. However, the USB Type-C and the Micro USB for existing mobile phones cannot meet a higher-level waterproof requirement, have become a bottleneck for restricting overall waterproof performance, and greatly affect waterproof experience of mobile phone users.

SUMMARY

This application provides a connector interface and a mobile terminal, to resolve a problem of a poor waterproof effect of a connector interface that exists in the prior art.

According to a first aspect, this application provides a connector interface. The connector interface includes a substrate, and a first metal shell, a second metal shell, and an I/M component that are disposed on the substrate, where the second metal shell is in a sealed connection to the first metal shell; one end of the I/M component is located in the second metal shell, and the other end penetrates through the second metal shell and is inserted into the first metal shell; and the end of the I/M component that is located in the second metal shell is fixedly connected to the second metal shell, so that the I/M component is secured in an insertion direction.

In the foregoing technical solution, the I/M component is wrapped by the first metal shell and the second metal shell that are disposed, and a depth by which a connection terminal is inserted is limited by the disposed second metal shell, so that an opening is avoided on the first metal shell, and a sealing effect of the connector interface is improved, thereby improving a waterproof effect of the connector interface, to cause the waterproof effect of the connector interface to reach the IPX8 waterproof standard (a distance between the top of a detected object and a water surface is 1.5 meters to 30 meters, the detected object is put in water for 30 minutes, performance is not affected, and water leakage is avoided on an interface).

In a specific implementation solution, the I/M component includes a first component and a second component; the first component is fixedly connected to the second component, and along a direction perpendicular to the insertion direction, a section dimension of the first component is greater than a section dimension of the second component; the first component is located in the second metal shell body and is wrapped and secured by the second metal shell; and the second component penetrates through the second metal shell and is inserted into the first metal shell.

Specifically, the I/M (insert mold) component is an integrally molded component made of metal and plastic; and the first component is made of metal, and the second component is made of plastic.

In a specific implementation solution, to improve a sealing effect, a packaging adhesive layer used to package the first component is provided on a surface of the second metal shell away from the first metal shell. Therefore, a sealing effect of an entire device is improved.

In a specific implementation solution, to improve an anti-interference capability of the connector interface, when the second metal shell is disposed, the second metal shell is grounded. The second metal shell is grounded, so that a shielding effect of a shell body for the I/M component is improved, thereby improving an anti-electromagnetic interference capability of the connector interface.

In a specific implementation solution, the first metal shell is fixedly connected to the second metal shell through welding. The first metal shell is connected to the second metal shell through laser spot welding, thereby ensuring stability of a connection between the first metal shell and the second metal shell, and ensuring a sealing effect of the first metal shell and the second metal shell.

In a specific implementation solution, the first metal shell and the second metal shell are iron shells. When the iron shells are used, a relatively good supporting effect is achieved, and costs are low. In addition, because of good electrical conductivity of iron, the anti-interference capability of the connector interface is ensured.

In a specific implementation solution, the second metal shell is a shell body having an opening at one end, and a through hole for the second component to penetrate through is provided on the other end of the shell body; and the first component abuts against a side wall of the through hole. The I/M component is limited by using the side wall of the through hole to ensure a position of the I/M component. In addition, when being limited, the I/M component is clamped in the second metal shell. To be specific, when the I/M component is inserted into the shell body, along the insertion direction of the I/M component, a structure in the second metal shell that is located around the through hole abuts against a vertical part of the I/M component, and the position of the I/M component is limited, to ensure the depth by which the I/M component is inserted.

In a specific implementation solution, the first metal shell is a shell body having openings at two ends, and the second metal shell is nested in the first metal shell. When the foregoing manner is used, the first metal shell and the second metal shell are disposed in a nested manner. In another solution, the first metal shell and the second metal shell are arranged side by side. To be specific, the first metal shell and the second metal shell are arranged in parallel.

In a specific implementation solution, the packaging layer extends outward to the outside of the second metal shell and covers a connection point between the I/M component and the substrate. The packaging layer extends outward to the connection point between the I/M component and the substrate, thereby improving a sealing effect of an entire interface.

In a specific solution, the connector interface is a Type-C interface or a USB port.

In a specific implementation solution, the packaging layer is a packaging adhesive layer. The packaging adhesive layer has a good packaging effect.

According to a second aspect, this application further provides a mobile terminal. The mobile terminal includes a mobile terminal body and a connector interface disposed on the mobile terminal body, where the connector interface includes a substrate, and a first metal shell, a second metal shell, and an I/M component that are disposed on the substrate, where the second metal shell is in a sealed connection to the first metal shell; one end of the I/M component is located in the second metal shell, and the other end penetrates through the second metal shell and is inserted into the first metal shell; and the end of the I/M component that is located in the second metal shell is fixedly connected to the second metal shell, so that the I/M component is secured in an insertion direction.

In the foregoing technical solution, the I/M component is wrapped by the first metal shell and the second metal shell that are disposed, and a depth by which a connection terminal is inserted is limited by the disposed second metal shell, so that an opening is avoided on the first metal shell, and a sealing effect of the connector interface is improved, thereby improving a waterproof effect of the connector interface, to cause the waterproof effect of the connector interface to reach the IPX8 waterproof standard (a distance between the top of a detected object and a water surface is 1.5 meters to 30 meters, the detected object is put in water for 30 minutes, performance is not affected, and water leakage is avoided on an interface).

In a specific implementation solution, the I/M component includes a first component and a second component; the first component is fixedly connected to the second component, and along a direction perpendicular to the insertion direction, a section dimension of the first component is greater than a section dimension of the second component; the first component is located in the second metal shell body and is wrapped and secured by the second metal shell; and the second component penetrates through the second metal shell and is inserted into the first metal shell.

Specifically, the I/M (insert mold) component is an integrally molded component made of metal and plastic; and the first component is made of metal, and the second component is made of plastic.

In a specific implementation solution, to improve a sealing effect, a packaging adhesive layer used to package the first component is provided on a surface of the second metal shell away from the first metal shell. Therefore, a sealing effect of an entire device is improved.

In a specific implementation solution, to improve an anti-interference capability of a Type-C interface, when the second metal shell is disposed, the second metal shell is grounded. The second metal shell is grounded, so that a shielding effect of a shell body for the I/M component is improved, thereby improving an anti-electromagnetic interference capability of the connector interface.

In a specific implementation solution, the first metal shell is fixedly connected to the second metal shell through welding. The first metal shell is connected to the second metal shell through laser spot welding, thereby ensuring stability of a connection between the first metal shell and the second metal shell, and ensuring a sealing effect of the first metal shell and the second metal shell.

In a specific implementation solution, the first metal shell and the second metal shell are iron shells. When the iron shells are used, a relatively good supporting effect is achieved, and costs are low. In addition, because of good electrical conductivity of iron, the anti-interference capability of the connector interface is ensured.

In a specific implementation solution, the second metal shell is a shell body having an opening at one end, and a through hole for the second component to penetrate through is provided on the other end of the shell body; and the first component abuts against a side wall of the through hole. The I/M component is limited by using the side wall of the through hole to ensure a position of the I/M component. In addition, when being limited, the I/M component is clamped in the second metal shell. To be specific, when the I/M component is inserted into the shell body, along the insertion direction of the I/M component, a structure in the second metal shell that is located around the through hole abuts against a vertical part of the I/M component, and the position of the I/M component is limited, to ensure the depth by which the I/M component is inserted.

In a specific implementation solution, the first metal shell is a shell body having openings at two ends, and the second metal shell is nested in the first metal shell. When the foregoing manner is used, the first metal shell and the second metal shell are disposed in a nested manner. In another solution, the first metal shell and the second metal shell are arranged side by side. To be specific, the first metal shell and the second metal shell are arranged in parallel.

In a specific implementation solution, the packaging layer extends outward to the outside of the second metal shell and covers a connection point between the I/M component and the substrate. The packaging layer extends outward to the connection point between the I/M component and the substrate, thereby improving a sealing effect of an entire interface.

In a specific solution, the connector interface is a Type-C interface or a USB port.

DESCRIPTION OF EMBODIMENTS

Figure 1:
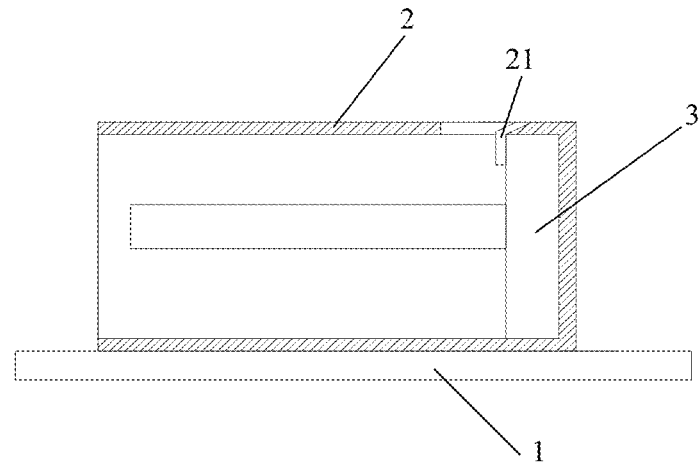
FIG. 1 is a schematic diagram of a connector interface in the prior art.

In the prior art, as shown in FIG. 1, a Type-C interface mainly includes a substrate 1, an I/M component 3, and a shell body 2. The I/M component 3 is secured in the shell body 2, and when the I/M component 3 is secured, a vertical part of the I/M component 3 is inserted into the shell body 2. A horizontal part of the I/M component 3 is exposed to the outside of the shell body 2 and matches a block edge 21 on the shell body 2 for securing. The block edge 21 is formed through punching on the shell body 2. Consequently, a gap, a hole, and the like are formed on the shell body 2 to affect a waterproof effect of the Type-C interface. To resolve the foregoing technical problem, this application provides a connector interface. Specifically, as shown in FIG. 2a, FIG. 2b, FIG. 2c, and FIG. 3a, FIG. 2a, FIG. 2b, and FIG. 2c show an appearance and a structure of the connector interface disclosed in this application, and FIG. 3a shows a sectional view of the connector interface. An embodiment of this application provides a connector interface. The connector interface includes a substrate 10. A shell body is disposed on the substrate 10. An I/M component 50 is inserted into the shell body, and the I/M component 50 is electrically connected to the substrate 10 by using a connecting pin. The I/M component 50 is configured to match an insertion terminal to form a connector.

During a specific disposition, the shell body includes two parts that are respectively a first metal shell 30 and a second metal shell 20, and the second metal shell 20 is in a sealed connection to the first metal shell 30. During a specific disposition, the first metal shell body 30 is a main shell body (Main-shell), and the second metal shell 20 is a sub-shell body (Sub-shell). When the I/M component 50 is inserted, one end of the I/M component 50 is located in the second metal shell 20, and the other end penetrates through the second metal shell 20 and is inserted into the first metal shell 30. The end of the I/M component 50 that is located in the second metal shell is fixedly connected to the second metal shell 20, so that the I/M component 50 is secured in an insertion direction. Specifically, the I/M component 50 includes a first component 52 and a second component 51. The first component 52 is fixedly connected to the second component 51, and along a direction perpendicular to the insertion direction, a section dimension of the first component 52 is greater than a section dimension of the second component 51. The first component 52 is located in the second metal shell body 20 and is wrapped and secured by the second metal shell, and the second component 51 penetrates through the second metal shell 20 and is inserted into the first metal shell 30. In a structure shown in FIG. 3, the first metal shell 30 wraps the second component 51 of the I/M component 50, and is configured to form a structure for limiting an insertion space of an insertion terminal that matches the I/M component 50. To be specific, when the insertion terminal is inserted, an outer side surface of the insertion terminal matches an inner wall of the first metal shell 30, to ensure a stable electrical connection between the insertion terminal and the I/M component 50. The second metal shell 20 wraps the first component 52 of the I/M component 50. In the foregoing manner, the first component 52 of the I/M component 50 is clamped and secured with the second metal shell 20, so that another spring plate structure does not need to be provided on the shell to secure the I/M component 50, thereby ensuring completeness of the formed shell. To be specific, other positions than an insertion port of the connector interface on the shell all have good sealing performance, thereby improving a waterproof effect of the connector interface, to cause the waterproof effect of the connector interface to reach the IPX8 waterproof standard (a distance between the top of a detected object and a water surface is 1.5 meters to 30 meters, the detected object is put in water for 30 minutes, performance is not affected, and water leakage is avoided on an interface).

During specific manufacturing, the I/M component (insert mold, a connecting piece, and specifically, an insertion mold) is an integrally molded component made of metal and plastic. The first component 52 is made of metal, and the second component 51 is made of plastic. Specifically, the metal is copper, aluminum, or other metal, and the plastic material is, for example, polyethylene or polypropylene.

In addition, during specific securing, a packaging adhesive layer 40 used to package the first component 52 is provided on a surface of the second metal shell 20 away from the first metal shell 30, and is specifically a packaging layer 40 for packaging the first component 52 of the I/M component 50. To be specific, the I/M component 50 and the second metal shell 20 are sealed together by using the disposed packaging layer 40. In addition, during a specific disposition, the first metal shell 30 and the second metal shell 20 are fixedly connected to the substrate 10, and the first metal shell 30 is in a sealed connection to the second metal shell 20. In addition, the second metal shell 20 is in a sealed connection to the first component 52 of the I/M component 50 by using the packaging layer 40. Therefore, in an entire structure of the formed connector interface, the I/M component 50 is secured through matching between the packaging layer 40 and the second metal shell 20, thereby further improving a sealing effect.

Figure 4:
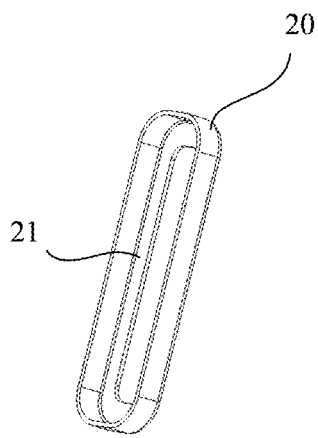
FIG. 4 is a schematic structural diagram of a second metal shell according to this application.
Figure 5:
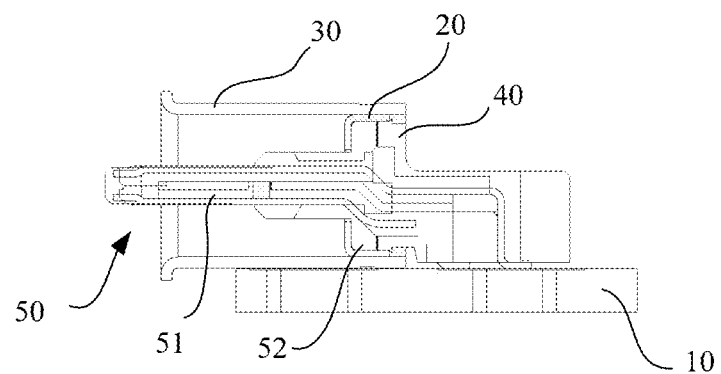
FIG. 5 is a sectional view of another connector interface according to this application.

During a specific disposition, the first metal shell 30 and the second metal shell 20 may be disposed in different manners. Structures of the first metal shell 30 and the second metal shell 20 are described in detail below with reference to the accompanying drawings. Continue to refer to FIG. 5, FIG. 5 shows a matching structure of the first metal shell 30 and the second metal shell 20. In the matching manner, the first metal shell 30 is a shell body having openings at two ends, and the second metal shell 20 is nested in the first metal shell 30. When the foregoing manner is used, the first metal shell 30 and the second metal shell 20 are disposed in a nested manner. When the manner is used, the first metal shell 30 is a cuboid-shaped shell body having openings at two ends. As shown in FIG. 4, the second metal shell 20 is a shell body having openings at two ends, and a shoulder 21 is disposed on one end of the second metal shell 20. Alternatively, it may be understood that, the second metal shell 20 is a shell body having an opening at one end, and a through hole for the second component 51 to penetrate through is provided on a sealed end. The shoulder 21 is a structure of an area around the through hole. During specific insertion, the first component 52 abuts against a side wall of the through hole, to limit a depth by which the I/M component 50 is inserted. During a specific disposition, the second metal shell 20 is inserted into the first metal shell 30, and one end of the second metal shell 20 that has the shoulder 21 is located in the first metal shell 30; and then, the second metal shell 20 is in a sealed connection to the first metal shell 30. During a specific connection, the first metal shell 30 is fixedly connected to the second metal shell 20 through welding. More specifically, the first metal shell 30 is fixedly connected to the second metal shell 20 through laser spot welding, thereby ensuring stability of a connection between the first metal shell 30 and the second metal shell 20, and ensuring a sealing effect of the first metal shell 30 and the second metal shell 20. In this manner, the first metal shell 30 is divided into two parts by using the shoulder 21 of the second metal shell 20, where a part located on a head end is configured to wrap the second component 51 of the I/M component 50, and the other part on a tail end is configured to wrap the second metal shell 20. In addition, because of a structure of the shoulder 21, when the I/M component 50 is secured in the shell body, the first component 52 of the I/M component 50 is clamped by the shoulder 21, to limit a position at which the I/M component 50 is inserted into the shell body. To be specific, the I/M component 50 is positioned by using the shoulder 21. In addition, when the insertion terminal is inserted into the connector interface, the disposed shoulder 21 can also limit a depth by which the insertion terminal is inserted into the shell body.

Figure 2A:
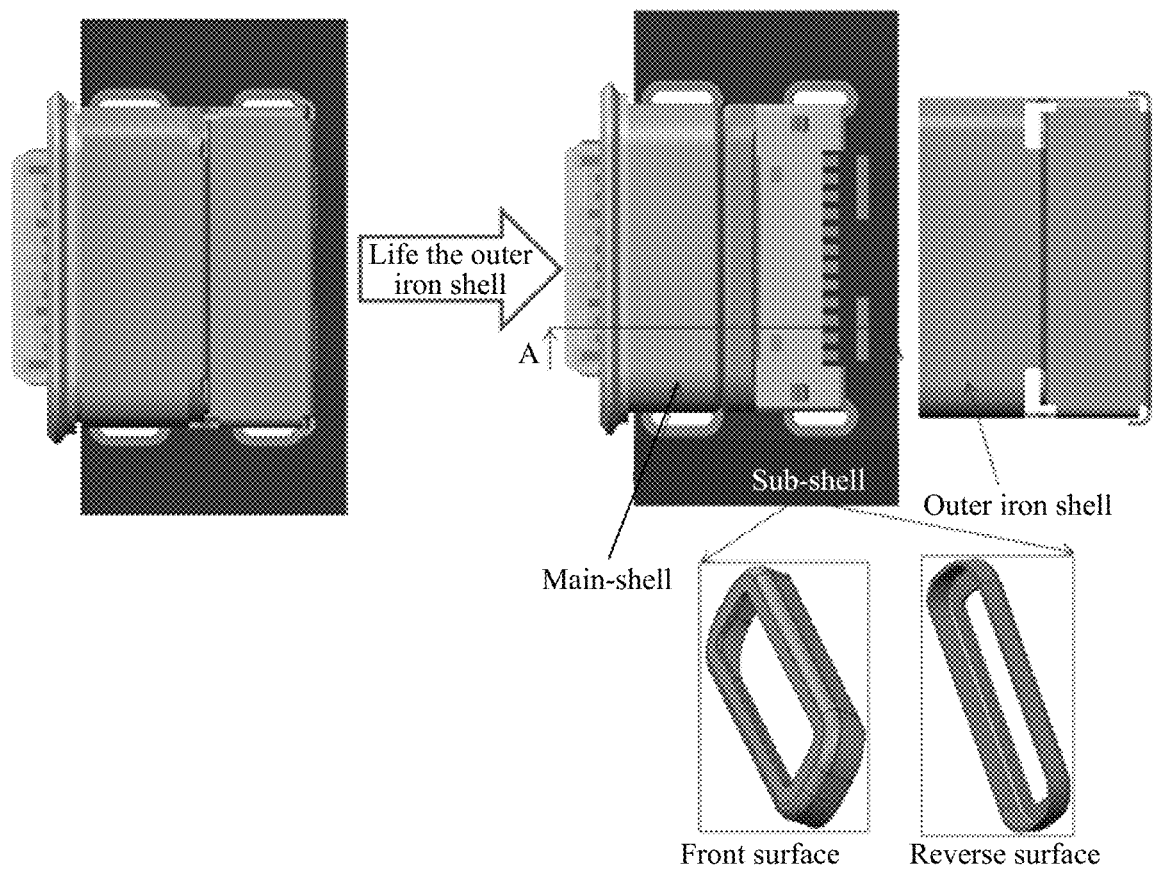
FIG. 2a is a schematic exploded view of a connector interface according to this application.
Figure 2B:
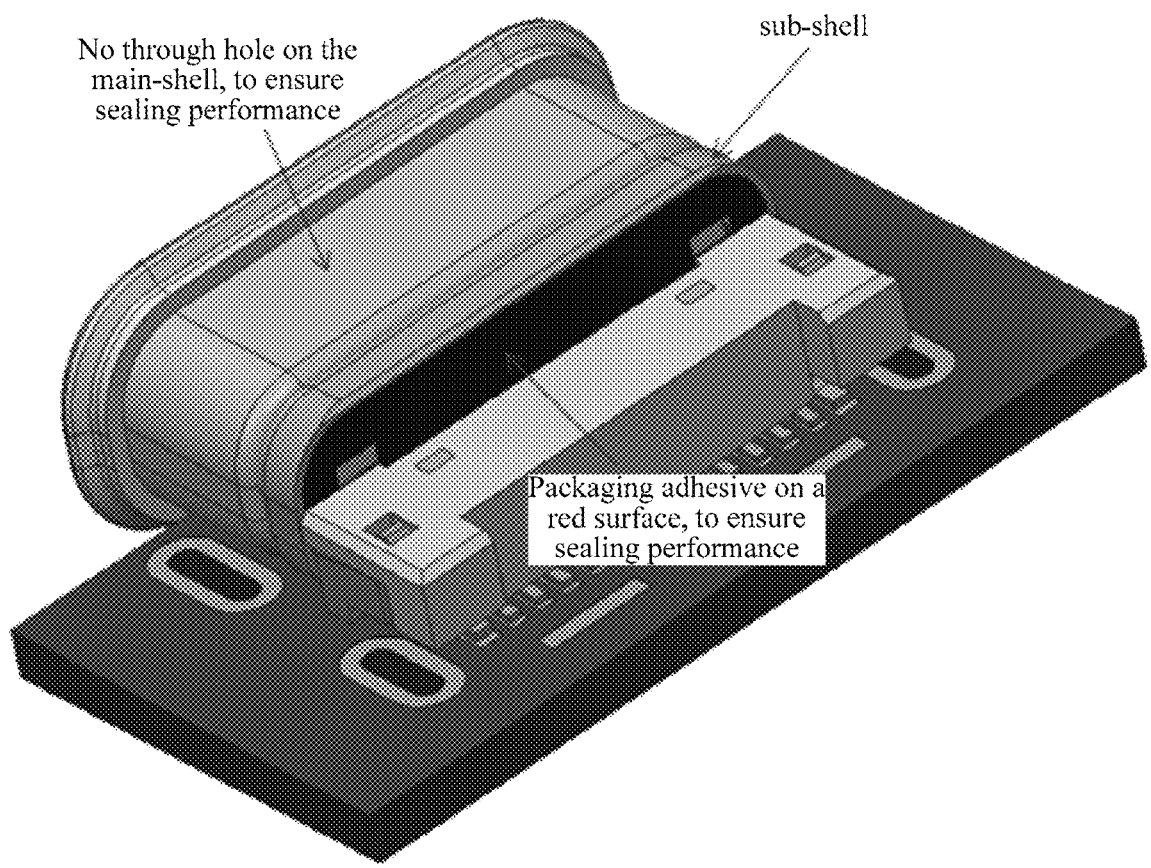
FIG. 2b is a three-dimensional diagram of a connector interface according to this application.
Figure 2C:
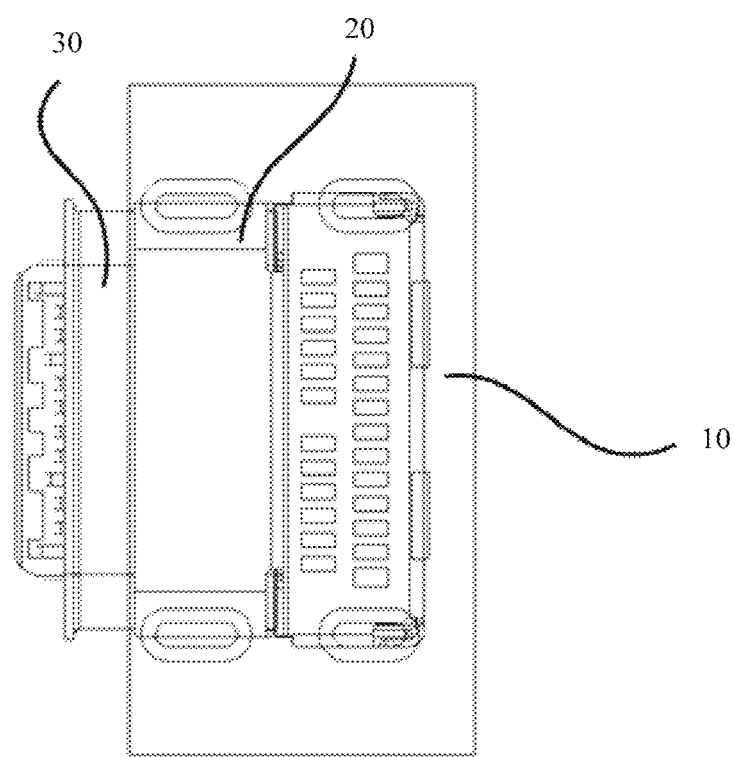
FIG. 2c is a top view of a connector interface according to this application.
Figure 3A:
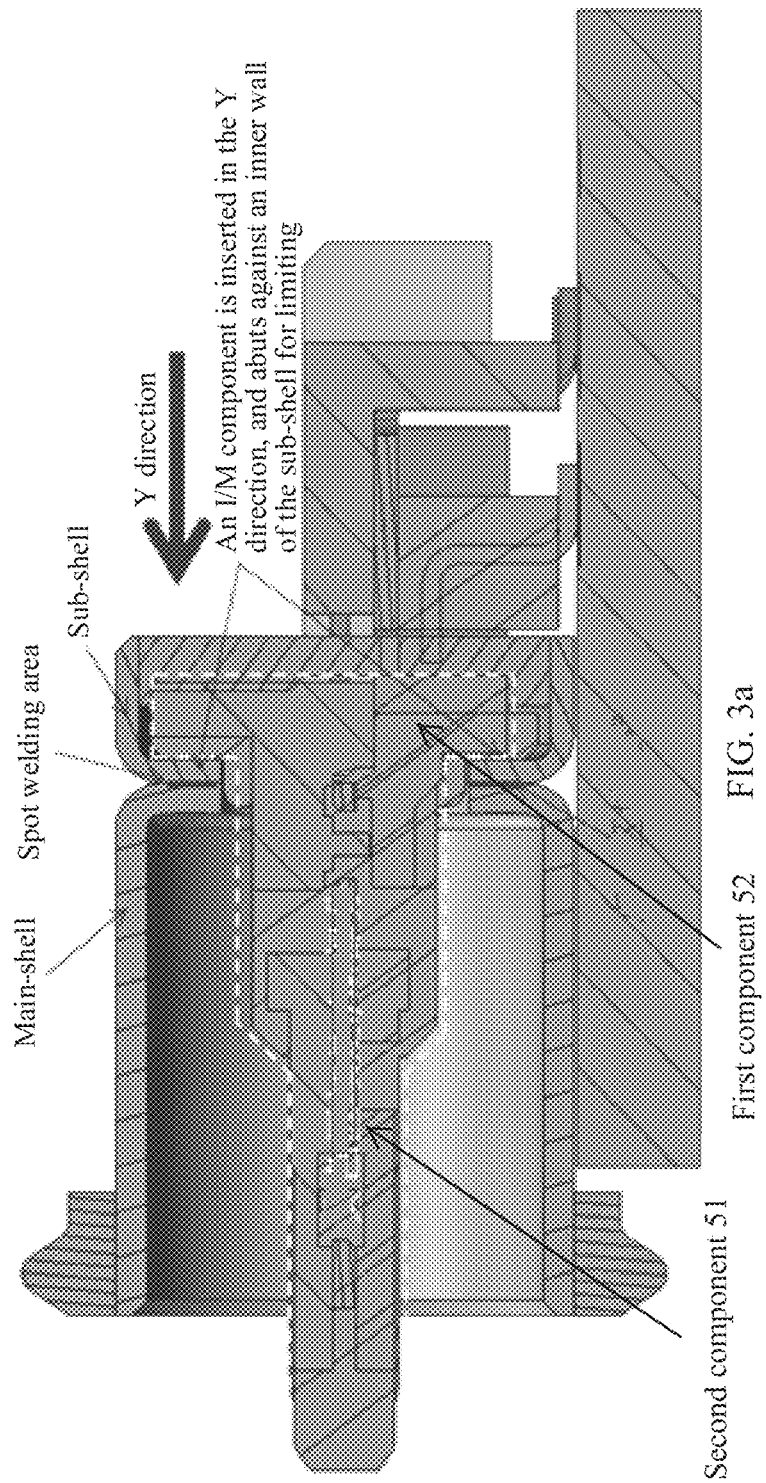
FIG. 3a is a sectional view of a connector interface according to this application.

In addition, in a structure shown in FIG. 2*b*, the first metal shell 30 and the second metal shell 20 are both fixedly connected to the substrate 10. Because the second metal shell 20 is embedded in the first metal shell 30, the second metal shell 20 is equivalent to being fixedly connected to the substrate 10 by using the first metal shell 30. In a more specific solution, to improve an anti-interference effect of the connector interface, the first metal shell 30 is grounded. Specifically, the first metal shell 30 is grounded on the substrate 10. Specifically, during a disposition, the first metal shell 30 is welded on the substrate 10, and is grounded by using a weld leg, or the first metal shell 30 is grounded on the substrate 10 by using a connection cable. In this application, it may be apparently learned that, because the second metal shell 20 is nested in the first metal shell 30, it may be considered that the first metal shell 30 wraps the entire I/M component 50. Therefore, when the first metal shell 30 is grounded, the first metal shell 30 can provide a larger shielding space, thereby improving an anti-electromagnetic interference capability of the connector interface. In this embodiment, the second metal shell 20 is nested in the first metal shell 30 and is electrically connected to the first metal shell 30. Therefore, when the first metal shell 30 is grounded, the second metal shell 20 is also in a grounded state.

Figure 3B:
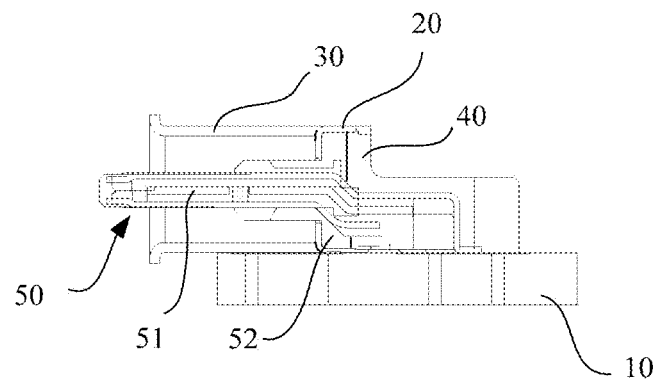
FIG. 3b is a sectional view of another connector interface according to this application.

As shown in FIG. 3*a* and FIG. 3*b*, FIG. 3*a* and FIG. 3*b* show another matching manner of the first metal shell 30 and the second metal shell 20 in this application. In this matching manner, the first metal shell 30 and the second metal shell 20 are disposed side by side. During a specific connection, the first metal shell 30 and the second metal shell 20 are arranged side by side along a length direction of the I/M component 50. A structure of the second metal shell 20 also uses a structure shown in FIG. 4. In addition, during a specific connection, the first metal shell 30 and the second metal shell 20 are connected through welding, and are welded in a spot welding area shown in FIG. 3*a*. Specifically, the first metal shell 30 and the second metal shell 20 are connected through laser spot welding, and during welding, the end of the second metal shell 20 that has the shoulder 21 is connected to the first metal shell 30 through welding, so that the shoulder 21 can form a structure for limiting the depth by which the I/M component 50 is inserted, and can also be used as a structure for limiting the depth by which the insertion terminal is inserted.

In addition, in a structure shown in FIG. 5, the first metal shell 30 and the second metal shell 20 are separately grounded. During a disposition, the first metal shell 30 and the second metal shell 20 are welded on the substrate 10, and are grounded by using a weld leg, or the first metal shell 30 and the second metal shell 20 are grounded on the substrate 10 by using a connection cable. To be specific, the first metal shell 30 and the second metal shell 20 together enclose a shielding space. Because the first metal shell 30 and the second metal shell 20 wrap the entire I/M component 50, a shielding space larger than a shell body in the prior art can be provided, thereby improving the anti-electromagnetic interference capability of the connector interface.

It should be understood that, regardless of a manner in which the first metal shell 30 and the second metal shell 20 are disposed, the first metal shell 30 and the second metal shell 20 only need to wrap the entire I/M component 50. In addition, during a specific disposition, the first metal shell 30 and the second metal shell 20 are both manufactured by using metal materials, for example, copper, aluminum, iron, or other common metal materials. In a specific implementation solution, the first metal shell 30 and the second metal shell 20 are iron shells. When the iron shells are used, a relatively good supporting effect is achieved, and costs are low. In addition, because of good electrical conductivity of iron, the anti-interference capability of the connector interface is ensured.

In this application, a waterproof effect is achieved through matching between the first metal shell 30 and the second metal shell 20. In a preferred solution, a gap between the second metal shell 20 and the I/M component 50 may be sealed by using the packaging layer 40. During a specific disposition, the packaging layer 40 is a packaging adhesive layer. As shown in FIG. 3 and FIG. 5, after the first component 52 of the I/M component 50 is inserted into the second metal shell 20, the first component 52 of the I/M component 50 is sealed by using the packaging layer 40, to ensure a sealing effect of an entire connector interface. In a specific implementation solution, to improve the sealing effect, the packaging layer 40 extends outward to the outside of the second metal shell 20 and covers a connection point between the I/M component 50 and the substrate 10. To be specific, the packaging layer 40 extends outward to the connection point between the I/M component 50 and the substrate 10, thereby ensuring a packaging effect of the packaging layer 40, and further improving a packaging effect when the I/M component 50 is connected to the substrate 10.

The connector interface in this application may be any electrical connection interface. For example, a USB port and a Type-C interface are both applicable to this application. In the foregoing technical solution, a connection terminal is wrapped by the first metal shell and the second metal shell that are disposed, and the depth by which the connection terminal is inserted is limited by the disposed second metal shell, so that an opening is avoided on the first metal shell, and a sealing effect of the connector interface is improved, thereby improving a waterproof effect of the connector interface, to cause the waterproof effect of the connector interface to reach the IPX8 waterproof standard (a distance between the top of a detected object and a water surface is 1.5 meters to 30 meters, the detected object is put in water for 30 minutes, performance is not affected, and water leakage is avoided on an interface).

In addition, this application further provides a mobile terminal. The mobile terminal includes a mobile terminal body and a connector interface disposed on the mobile terminal body. The connector interface includes a substrate, and a first metal shell, a second metal shell, and an I/M component that are disposed on the substrate. The second metal shell is in a sealed connection to the first metal shell; one end of the I/M component is located in the second metal shell, and the other end penetrates through the second metal shell and is inserted into the first metal shell; and the end of the I/M component that is located in the second metal shell is fixedly connected to the second metal shell, so that the I/M component is secured in an insertion direction.

The mobile terminal may be a common mobile terminal such as a mobile phone, a computer, a notebook computer, or a tablet computer.

In the foregoing technical solution, the I/M component is wrapped by the first metal shell and the second metal shell that are disposed, and a depth by which a connection terminal is inserted is limited by the disposed second metal shell, so that an opening is avoided on the first metal shell, and a sealing effect of the connector interface is improved, thereby improving a waterproof effect of the connector interface, to cause the waterproof effect of the connector interface to reach the IPX8 waterproof standard (a distance between the top of a detected object and a water surface is 1.5 meters to 30 meters, the detected object is put in water for 30 minutes, performance is not affected, and water leakage is avoided on an interface).

In addition, the connector interface provided in this application may be the connector interface in any one of the foregoing embodiments. Therefore, the connector interface on the mobile terminal body is not described in detail again.

Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. An electrical connector interface, the electrical connector interface comprising a substrate, a first metal shell, a second metal shell, and an insert mold (I/M) component that are disposed on the substrate,
   wherein the second metal shell is in a sealed connection to the first metal shell, wherein one end of the I/M component is located in the second metal shell, wherein the other end of the I/M component penetrates through the second metal shell and is inserted into the first metal shell, and wherein the end of the I/M component that is located in the second metal shell is fixedly connected to the second metal shell, so that the I/M component is secured in an insertion direction,
   wherein the I/M component comprises a first component and a second component, wherein the first component is located in the second metal shell, wherein the first component is wrapped and secured by the second metal shell, wherein a packaging adhesive layer used to package the first component is provided on a surface of the second metal shell away from the first metal shell, and wherein the second component penetrates through the second metal shell and is inserted into the first metal shell.

2. The electrical connector interface according to claim 1, wherein the first component is fixedly connected to the second component, and along a direction perpendicular to the insertion direction, wherein a section dimension of the first component is greater than a section dimension of the second component.

3. The electrical connector interface according to claim 2, wherein the first component of the I/M component is made of metal, and wherein the second component of the I/M component is made of plastic.

4. The electrical connector interface according to claim 2, wherein the packaging adhesive layer is configured to cause the second metal shell to be in a sealed connection to the first component, providing an improved sealing effect.

5. The electrical connector interface according to claim 1, wherein the second metal shell is grounded.

6. The electrical connector interface according to claim 1, wherein the first metal shell is fixedly connected to the second metal shell through welding.

7. The electrical connector interface according to claim 1, wherein the second metal shell is a shell body having two ends, wherein one of the two ends comprises an opening, wherein the other one of the two ends comprises a through hole for the second component to penetrate through, and wherein the first component abuts against a side wall of the through hole.

8. The electrical connector interface according to claim 7, wherein:
   the first metal shell is a shell body having openings at two ends, and wherein the second metal shell is nested in the first metal shell; or
   the first metal shell and the second metal shell are arranged side by side.

9. The electrical connector interface according to claim 4, wherein the packaging adhesive layer extends outward to the outside of the second metal shell and covers a connection point between the I/M component and the substrate.

10. The electrical connector interface according to claim 1, wherein the connector interface is a Type-C interface or a USB port.

11. A mobile terminal, the mobile terminal comprising a mobile terminal body and an electrical connector interface disposed on the mobile terminal body, wherein the electrical connector interface comprises a substrate, a first metal shell, a second metal shell, and an insert mold (I/M) component that are disposed on the substrate,
    wherein the second metal shell is in a sealed connection to the first metal shell, wherein one end of the I/M component is located in the second metal shell, wherein the other end of the I/M component penetrates through the second metal shell and is inserted into the first metal shell, and wherein the end of the I/M component that is located in the second metal shell is fixedly connected to the second metal shell, so that the I/M component is secured in an insertion direction,
    wherein the I/M component comprises a first component and a second component, wherein the first component is located in the second metal shell, wherein the first component is wrapped and secured by the second metal shell, wherein a packaging adhesive layer used to package the first component is provided on a surface of the second metal shell away from the first metal shell, and wherein the second component penetrates through the second metal shell and is inserted into the first metal shell.

12. The mobile terminal according to claim 11, wherein the first component is fixedly connected to the second component, and along a direction perpendicular to the insertion direction, wherein a section dimension of the first component is greater than a section dimension of the second component.

13. The mobile terminal according to claim 12, wherein the first component of the I/M component is made of metal, and the second component of the I/M component is made of plastic.

14. The mobile terminal according to claim 12, wherein the packaging adhesive layer is configured to cause the second metal shell to be in a sealed connection to the first component, providing an improved sealing effect.

15. The mobile terminal according to claim 11, wherein the second metal shell is grounded.

16. The mobile terminal according to claim 11, wherein the first metal shell is fixedly connected to the second metal shell through welding.

17. The mobile terminal according to claim 11, wherein the second metal shell is a shell body having two ends, wherein one of the two ends comprises an opening, wherein the other one of the two ends comprises a through hole for the second component to penetrate through, and wherein the first component abuts against a side wall of the through hole.

18. The mobile terminal according to claim 17, wherein:
the first metal shell is a shell body having openings at two ends, and wherein the second metal shell is nested in the first metal shell; or
the first metal shell and the second metal shell are arranged side by side.

19. The mobile terminal according to claim 14, wherein the packaging adhesive layer extends outward to the outside of the second metal shell and covers a connection point between the I/M component and the substrate.

20. The mobile terminal according to claim 11, wherein the electrical connector interface is a Type-C interface or a USB port.

* * * * *